(12) United States Patent
Farnsworth

(10) Patent No.: US 8,355,721 B2
(45) Date of Patent: Jan. 15, 2013

(54) METHOD AND APPARATUS FOR MANAGING COMMUNICATION OF COMPRESSED MODE CAPABILITIES

(75) Inventor: Andrew Farnsworth, Bromsgrove (GB)

(73) Assignee: Research In Motion Limited, Waterloo, Ontario (CA)

( * ) Notice: Subject to any disclaimer, the term of this patent is extended or adjusted under 35 U.S.C. 154(b) by 1069 days.

(21) Appl. No.: 12/117,292

(22) Filed: May 8, 2008

(65) Prior Publication Data

US 2012/0064873 A1 Mar. 15, 2012

(51) Int. Cl.
*H04W 36/00* (2009.01)

(52) U.S. Cl. ........................................ 455/436

(58) Field of Classification Search .................. 370/280, 370/281, 282, 328, 331, 332, 334; 455/418, 455/422.1, 423, 434, 436, 437, 438, 439
See application file for complete search history.

(56) References Cited

U.S. PATENT DOCUMENTS 7,764,964 B2 * 7/2010 Moon et al. .................... 455/436
7,787,880 B2 * 8/2010 Ueda ............................ 455/439

OTHER PUBLICATIONS

3GPP TS 25.331 v5.17.0; 3rd Generation Partnership Project; Technical Specification Group Radio Access Network; Radio Resource Control (RRC); Protocol Specification; Release 5; Jun. 2006; 1045 pgs.

* cited by examiner

*Primary Examiner* — George Eng
*Assistant Examiner* — Hung Du
(74) *Attorney, Agent, or Firm* — Conley Rose, P.C.; J. Robert Brown, Jr.

(57) ABSTRACT

A method in a mobile communications apparatus, the mobile communications apparatus operable to communicate with a wireless communications network using a plurality of frequency bands, the mobile communications apparatus being capable of performing a measurement of one frequency band while using another or the same frequency band, the method comprising sending a measurement capability message to the wireless communications network, the measurement capability message including an information element designating the requirement for compressed mode for more than one of a plurality of combinations of a particular frequency band being used when another or the same frequency band is measured.

11 Claims, 10 Drawing Sheets

| GSM Operating Band | Uplink (MHz) | Downlink (MHz) |
|---|---|---|
| GSM 400 | 450.4 - 457.6 | 460.4 - 467.6 |
| GSM 400 | 478.8 - 486.0 | 488.8 - 496.0 |
| GSM 850 | 824.0 - 849.0 | 869.0 - 894.0 |
| GSM 900 (P-GSM) | 890.0 - 915.0 | 935.0 - 960.0 |
| GSM 900 (E-GSM) | 880.0 - 915.0 | 925.0 - 960.0 |
| GSM-R (R-GSM) | 876.0 - 880.0 | 921.0 - 925.0 |
| DCS 1800 | 1710.0 - 1785.0 | 1805.0 - 1880.0 |
| PCS 1900 | 1850.0 - 1910.0 | 1930.0 - 1990.0 |

| Information Element/Group name | Multi | Type and reference | Semantics description |
|---|---|---|---|
| Need for downlink compressed mode | | | |
| FDD measurements | | Boolean | TRUE means that the UE requires DL compressed mode in order to perform measurements on FDD |
| 3.84 Mcps TDD measurements | | Boolean | TRUE means that the UE requires DL compressed mode in order to perform measurements on 3.84 Mcps TDD |
| 1.28 Mcps TDD measurements | | Boolean | TRUE means that the UE requires DL compressed mode in order to perform measurements on 1.28 Mcps TDD |
| GSM measurements | | | |
| >GSM 900 | | Boolean | TRUE means that the UE requires DL compressed mode in order to perform measurements on GSM 900 |
| >DCS 1800 | | Boolean | TRUE means that the UE requires DL compressed mode in order to perform measurements on DCS 1800 |
| >GSM 1900 | | Boolean | TRUE means that the UE requires DL compressed mode in order to perform measurements on GSM 1900 |
| Multi-carrier measurement | | Boolean | TRUE means that the UE requires DL compressed mode in order to perform measurements on multi-carrier |
| Need for uplink compressed mode | | | |
| FDD measurements | | Boolean | TRUE means that the UE requires UL compressed mode in order to perform measurements on FDD |
| 3.84 Mcps TDD measurements | | Boolean | TRUE means that the UE requires UL compressed mode in order to perform measurements on 3.84 Mcps TDD |
| 1.28 Mcps TDD measurements | | Boolean | TRUE means that the UE requires DL compressed mode in order to perform measurements on 1.28 Mcps TDD |
| GSM measurements | | | |
| >GSM 900 | | Boolean | TRUE means that the UE requires UL compressed mode in order to perform measurements on GSM 900 |
| >DCS 1800 | | Boolean | TRUE means that the UE requires UL compressed mode in order to perform measurements on DCS 1800 |
| >GSM 1900 | | Boolean | TRUE means that the UE requires UL compressed mode in order to perform measurements on GSM 1900 |
| Multi-carrier measurement | | Boolean | TRUE means that the UE requires UL compressed mode in order to perform measurements on multi-carrier |

| Information Element/Group name | Multi | Type and reference | Semantics description |
|---|---|---|---|
| FDD measurements | 1 to <maxFreqBands FDD> | | |
| >FDD Frequency bands | | Enumerated(Band I, Band II, Band III) | |
| >Need for DL compressed mode | | Boolean | TRUE means that the UE requires DL compressed mode in order to perform measurements on the FDD frequency band indicated by the IE "FDD Frequency band" |
| >Need for UL compressed mode | | Boolean | TRUE means that the UE requires UL compressed mode in order to perform measurements on the FDD frequency band indicated by the IE "FDD Frequency band" |
| TDD measurements | 1 to <maxFreqBands TDD> | | |
| >TDD Frequency band | | Enumerated(a, b, c) | |
| >Need for DL compressed mode | | Boolean | TRUE means that the UE requires DL compressed mode in order to perform measurements on TDD frequency band indicated by the IE "FDD Frequency band" |
| >Need for UL compressed mode | | Boolean | TRUE means that the UE requires UL compressed mode in order to perform measurements on TDD frequency band indicated by the IE "TDD Frequency band" |
| GSM measurements | 1 to <maxFreqBands GSM> | | |
| >GSM Frequency band | | Enumerated (GSM450, GSM480, GSM850, GSM900P, GSM900E, GSM1800, GSM1900) | |
| >Need for DL compressed mode | | Boolean | TRUE means that the UE requires DL compressed mode in order to perform measurements on GSM frequency band indicated by the IE "GSM Frequency band" |
| >Need for UL compressed mode | | Boolean | TRUE means that the UE requires UL compressed mode in order to perform measurements on GSM frequency band indicated by the IE "GSM Frequency band" |
| Multi-carrier measurement | | | |
| >Need for DL compressed mode | | Boolean | TRUE means that the UE requires DLcompressed mode in order to perform measurements on multicarrier |
| >Need for UL compressed mode | | Boolean | TRUE means that the UE requires UL compressed mode in order to perform measurements on multicarrier |

| Information Element/Group name | Multi | Type and reference | Semantics description |
|---|---|---|---|
| FDD measurements | 1 to <maxFreqBands FDD> | | |
| >FDD Frequency bands | | Enumerated(Band I, Band II, Band III) | |
| >Need for DL compressed mode | | Boolean | TRUE means that the UE requires DL compressed mode in order to perform measurements on the FDD frequency band indicated by the IE "FDD Frequency band" |
| >Need for UL compressed mode | | Boolean | TRUE means that the UE requires UL compressed mode in order to perform measurements on the FDD frequency band indicated by the IE "FDD Frequency band" |
| TDD measurements | 1 to <maxFreqBands TDD> | | |
| >TDD Frequency band | | Enumerated(a, b, c) | |
| >Need for DL compressed mode | | Boolean | TRUE means that the UE requires DL compressed mode in order to perform measurements on TDD frequency band indicated by the IE "FDD Frequency band" |
| >Need for UL compressed mode | | Boolean | TRUE means that the UE requires UL compressed mode in order to perform measurements on TDD frequency band indicated by the IE "TDD Frequency band" |
| GSM measurements | 1 to <maxFreqBands GSM> | | |
| >GSM Frequency band | | Enumerated (GSM450, GSM480, GSM850, GSM900P, GSM900E, GSM1800, GSM1900) | |
| >Need for DL compressed mode | | Boolean | TRUE means that the UE requires DL compressed mode in order to perform measurements on GSM frequency band indicated by the IE "GSM Frequency band" |
| >Need for UL compressed mode | | Boolean | TRUE means that the UE requires UL compressed mode in order to perform measurements on GSM frequency band indicated by the IE "GSM Frequency band" |
| Multi-carrier measurement | | | |
| >Need for DL compressed mode | | Boolean | TRUE means that the UE requires DLcompressed mode in order to perform measurements on multicarrier |
| >Need for UL compressed mode | | Boolean | TRUE means that the UE requires UL compressed mode in order to perform measurements on multicarrier |
| CM Needed for all measurements of frequencies different to the frequency in use | | Boolean | TRUE means that the UE requires CM for all measurements |

METHOD AND APPARATUS FOR MANAGING COMMUNICATION OF COMPRESSED MODE CAPABILITIES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

This application relates to telecommunications systems in general, having for example application in UMTS (Universal Mobile Telecommunications System). In particular, this application relates to a method in a mobile communications apparatus, a computer program product, and a wireless communications network.

In a typical cellular radio system, a mobile communications apparatus communicates via a radio access network (RAN) to one or more core networks. The mobile communications apparatus or User Equipment (UE) comprises various types of equipment such as mobile telephones (also known as cellular or cell phones), laptops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that this disclosure is not intended to be limited to any particular mobile telecommunications system or standard.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for UMTS based upon GSM (Global System for Mobile Communications), and the 3GPP2 (Third Generation Partnership Project 2) has been known to publish and set standards for UMTS based upon CDMA (Code Division Multiple Access). Within the scope of a particular standardization body, specific partners publish and set standards in their respective areas.

BRIEF DESCRIPTION OF THE DRAWINGS

Embodiments will now be described, by way of example only, with reference to the attached drawings, in which:

FIG. 6 shows a set of measurement capability information elements;

FIG. 7 shows an alternative set of measurement capability information elements;

FIG. 8 shows a modified set of measurement capability information elements;

DETAILED DESCRIPTION OF THE DRAWINGS

Consider as an example a wireless mobile device which complies with the 3GPP specifications for the UMTS protocol. Such a wireless mobile device is generally referred to as user equipment (UE). The 3GPP technical specification 25.331, V5.17.0, referred to herein as the 25.331 specification, and incorporated herein by reference, addresses the subject of Radio Resource Control protocol for the UE—UTRAN (UTRA Network) interface.

Figure 1:
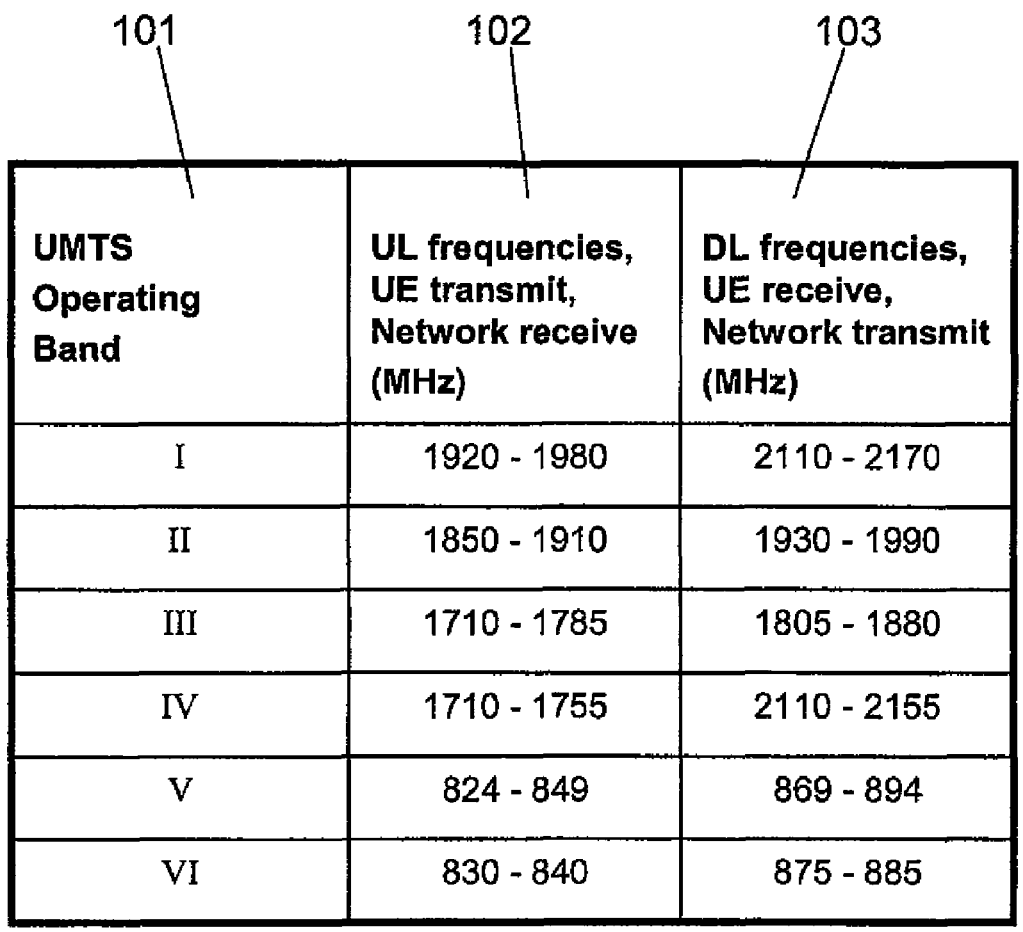
FIG. 1 shows uplink and downlink frequencies for a plurality of UMTS operating bands.

A UMTS Terrestrial Radio Access (UTRA) is designed to operate in bands using Frequency Division Duplex (FDD). There are a plurality of bands proposed and in use. Furthermore, new bands are frequently added to the UMTS specification. FIG. 1 shows six operating bands 101, numbered I to VI. Each operating band 101 comprises an uplink (UL) frequency range 102 and a downlink (DL) frequency range 103. A plurality of frequency channels are available within each band. A nominal frequency channel spacing is 5 MHz, but this may be altered to optimize network performance of a particular installation. Frequency Division Duplex (FDD) defines the use of a separate frequency channel for uplink and downlink communications between the UE and the UTRAN.

Figure 2:
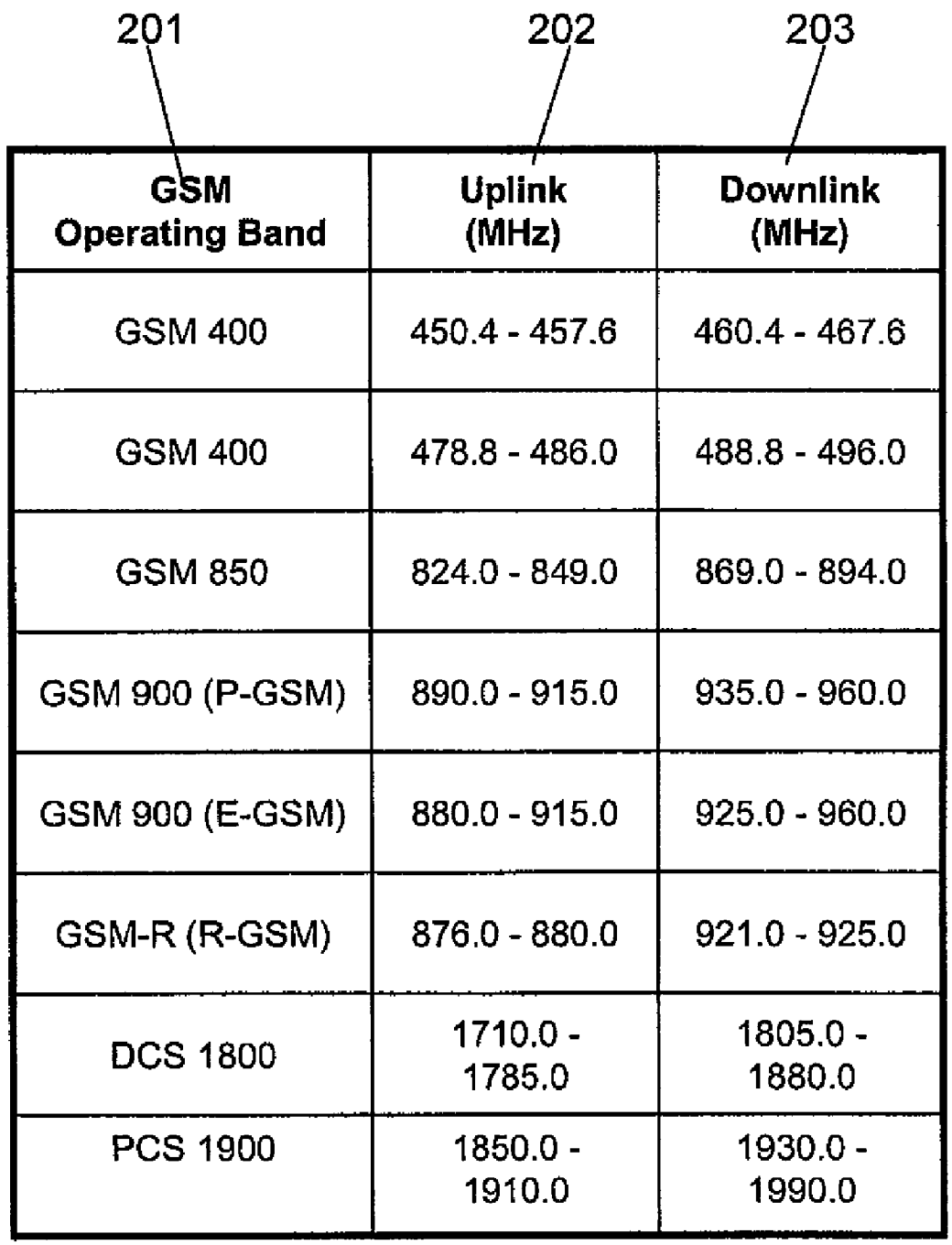
FIG. 2 shows uplink and downlink frequencies for a plurality of GSM operating bands.

For reference, FIG. 2 shows the uplink and downlink frequencies for a plurality of GSM operating bands 201. 8 GSM operating bands 201 are shown together with both the uplink frequencies 202 and the downlink frequencies 203 for each operating band 201.

A UE arranged to communicate on an FDD network may utilize compressed mode (CM) during communication with the network. Compressed mode is needed when making measurements on another frequency (inter-frequency) or on a different Radio Access Technology (inter-RAT). Inter-frequency measurements are performed between the channels of different frequencies within the same or a different UMTS band. Inter-RAT measurements are performed between the channels of different Radio Access Technologies (e.g. GSM and UMTS). In the compressed mode, transmission and reception by the UE transceiver on the band the UE is camped on is stopped for a short time. This time is called the Transmission Gap. This allows the transceiver to be used to perform measurements on the other frequency. Once the measurement has been made, transmission and reception resumes on the band the UE is camped on. Compressed Mode is the term used to define the method whereby the average data rate is maintained by compressing data in the frame either side of the transmission gap required for the measurement.

Figure 3:
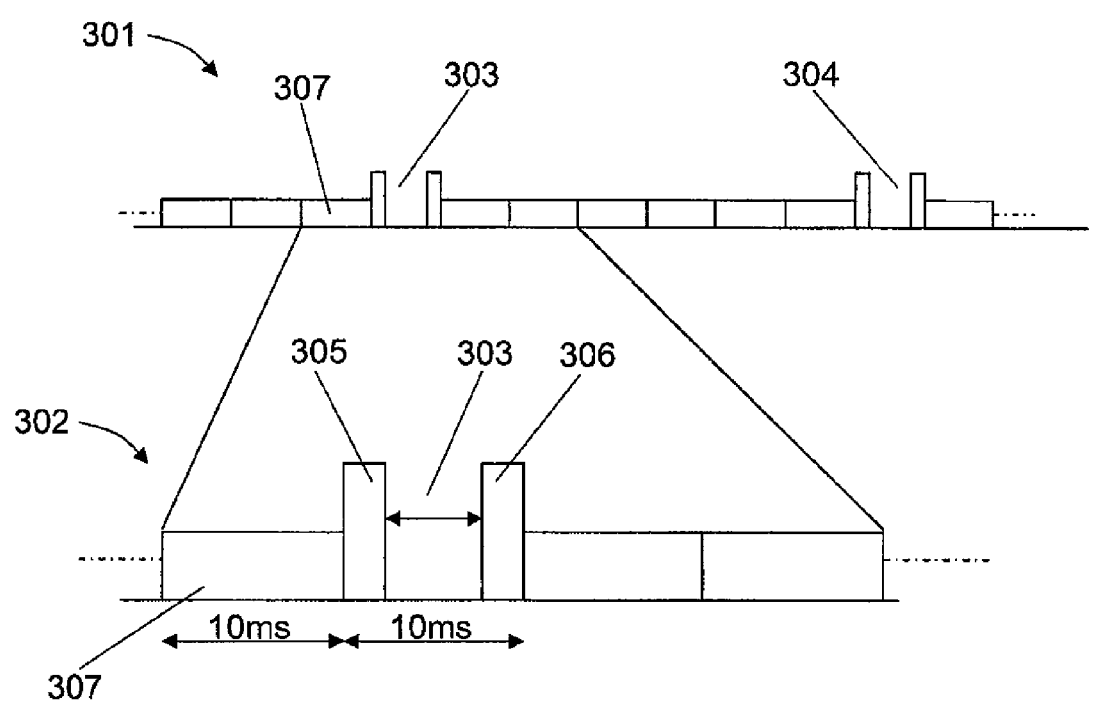
FIG. 3 shows the relative instantaneous transmit power for a plurality of frames including transmission gaps.

FIG. 3 illustrates the implementation of compressed mode. Time is on the horizontal axis and instantaneous transmit power is on the vertical axis. In FIG. 3, one frame (e.g. 307) is shown as having a duration of 10 milliseconds. Each frame comprises a plurality of slots. A series of frames 301 have transmission gaps 303 and 304. A more detailed view 302 of four frames around the transmission gap 303 is also shown. In compressed mode, a series of slots are not used for transmission of data. The number of consecutive slots in the series not used for transmission defines the transmission gap length. Either side of the transmission gap 303 the instantaneous transmit power of the slots of the frame remaining (305, 306) for data transmission is increased in order to keep the quality of the communication link unaffected by the reduced time available for transmission. Examples of the measure of quality are Bit Error Rate (BER) and Frame Error Rate (FER), although any other appropriate measure of quality may be used. The size of the increase in instantaneous transmit power is dependent upon the transmission time reduction method.

A transmission gap is necessary because UEs typically only have one transceiver. UE capabilities vary and the capabilities of a particular UE define whether it requires compressed mode in order to monitor cells on other frequencies. Accordingly, it is necessary for a UE to communicate its compressed mode requirements to the UTRAN. The compressed mode requirement may be expressed for any number of bands and radio access technologies.

The mechanism allowing information transmitted during at least one portion of a frame to be compressed in time, and a transmission gap to be created, include: reducing the spreading factor; and higher layer scheduling.

Reducing the Spreading Factor: the Spreading Factor is reduced by a factor of 2 so the data rate is doubled in the frame in which compression is to be carried out. The Spreading Factor is the ratio of the chips to baseband information rate, the chips being the smallest element of a slot. Because the data rate is doubled the same amount of data can be transmitted in half the time. Measurements can be performed in the transmission gap that remains.

Higher Layer scheduling: The higher layers are aware of the compressed mode schedule, so they may lower the data rate in the frame in which measurements need to be performed. This avoids the need for a new spreading factor and new channelization codes. For example, higher layers may set restrictions so that only a subset of the allowed Transport Format Combinations (TFCs) are used in a compressed frame.

The bit rate available for communication between the UE and the UTRAN is determined by a Transport Format Combination. Accordingly, by defining a subset of Transport Format Combinations available for use, the maximum number of bits that will be delivered to the physical layer during the compressed radio frame is then known and a transmission gap can be generated. In the downlink, the Transport Format Combination Indicator field is expanded at the expense of the data fields and this shall also be taken into account by higher layers when setting restrictions on which TFCs may be used.

In both downlink and uplink, both the above methods are supported. The network decides which frames are to be compressed. In compressed mode, compressed frames can occur periodically, as indicated in FIG. 3. Alternatively, compressed frames can occur on request or upon demand. The rate and type of compressed frames used is variable and depends on the environment and measured variables.

The UE must perform inter-frequency measurements in order to ascertain, for example, the strength of the signal available on a different potential frequency channel. This is necessary for a UE to determine whether a handover to a different frequency should be performed. The need for a UE to move to a different frequency channel may arise from the UE changing location such that the relative signal strength between two frequency channels changes.

When a network establishes that inter-frequency or inter-RAT measurements need to be performed, a radio network controller (RNC) of the network sends a MEASUREMENT CONTROL message to the UE. The MEASUREMENT CONTROL message instructs the UE to perform inter-frequency measurements and return a measurement report to the network. The following events can trigger the need for a measurement report.

Change of Best Frequency
  The estimated quality of the currently used frequency is below a certain threshold and the estimated quality of a non-used frequency is above a certain threshold (Q)
  The estimated quality of a non-used frequency is above a certain threshold
  The estimated quality of the currently used frequency is below a certain threshold (the threshold lower than that of (Q))

The compressed mode requirements of a particular UE are determined by the hardware configuration of the UE and the number and frequency ranges of the bands the UE is arranged to use. If compressed mode is required for measurements, and the Network instructs the UE to make measurements, then the Network must arrange for compressed mode to be used. Accordingly, the UE must report its compressed mode requirements to the Network. The UE does this using a UE CAPABILITY INFORMATION message. This message is prepared containing predefined Information Elements.

Described herein is a method for communicating the compressed mode requirements of a mobile communications apparatus to a communications network, the mobile communications apparatus is operable to communicate using more than one frequency band, and wherein the compressed mode requirement of more than one of said plurality of frequency bands are communicated using a measurement capability message including an information element designating the compressed mode requirement of more than one of said plurality of frequency bands.

As UEs become more versatile and support more bands, the amount of information required to report compressed mode requirements in the UE CAPABILITY INFORMATION message increases significantly. This leads to inefficient use of limited available communication bandwidth.

Implementation of the method described herein may allow for reduced data volume for a mobile communications apparatus communicating compressed mode requirements to a network. Further, implementation of the method described herein may also allow for a greater proportion of available communications bandwidth to be directed towards servicing a user's needs.

Other aspects and features of the proposed strategy will become apparent to those ordinarily skilled in the art upon review of the following description of specific embodiments of a method and apparatus for improved compressed mode capabilities.

A method and apparatus for managing communication of compressed mode capabilities is described. In the following description, for the purposes of explanation, numerous specific details are set forth in order to provide a thorough understanding of the claims. It will be apparent to one skilled in the art that the technique may be practiced without these specific details. In the other instances, well-known structures and devices are shown in block diagram form in order to avoid unnecessarily obscuring the content of this document.

The needs identified in the foregoing background, and other needs that will become apparent from the following description, are achieved by, in one aspect, a method for communicating the compressed mode requirements of a mobile communications apparatus to a communications network. In other aspects, the needs are achieved by a mobile communications apparatus operable to communicate with at least one network using a plurality of bands. In yet other aspects, the needs are achieved by a computer program product comprising code means stored on a computer readable medium for performing the method of communicating compressed mode requirements of a mobile communications apparatus to a network. In particular, the method may be implemented in a mobile telecommunications apparatus, with or without voice capabilities, or other electronic devices such as handheld or portable devices.

Figure 4:
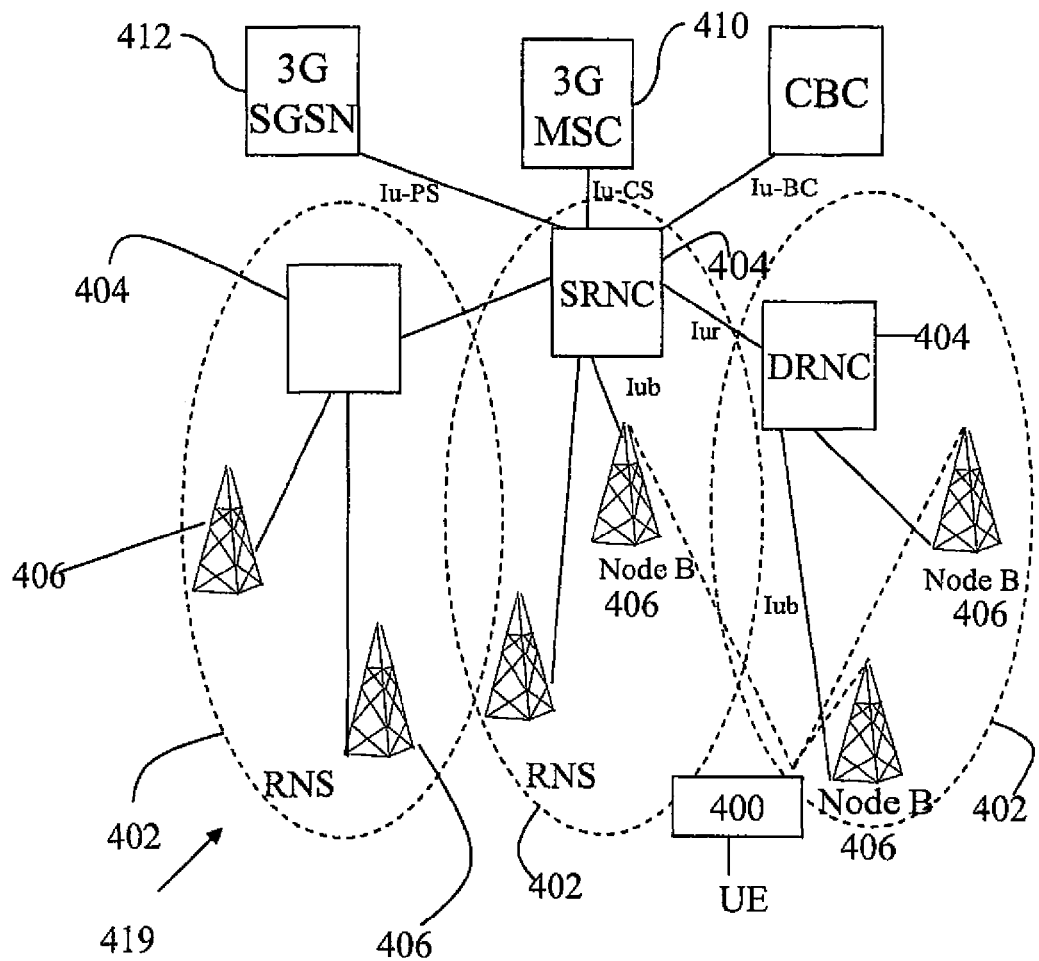
FIG. 4 is a schematic of a UMTS network.

The method disclosed herein may be implemented in a user equipment device of a wireless communications network. Referring to the drawings, FIG. 4 is a schematic diagram showing an overview of a network and a user equipment device. Clearly in practice there may be many user equipment devices operating with the network but for the sake of simplicity FIG. 4 only shows a single user equipment device 400. For the purposes of illustration, FIG. 4 also shows a radio access network 419 (UTRAN) used in a UMTS system having a few components. It will be clear to a person skilled in the art that in practice a network will include far more components than those shown.

The network 419 as shown in FIG. 4 comprises three Radio Network Subsystems (RNS) 402. Each RNS has a Radio Network Controller (RNC) 404. Each RNS 402 has one or more Node B 402 which are similar in function to a Base Transmitter Station of a GSM radio access network. User Equipment UE 400 may be mobile within the radio access network. Radio connections (indicated by the straight dotted lines in FIG. 4) are established between the UE and one or more of the Node Bs in the UTRAN.

Figure 5A:
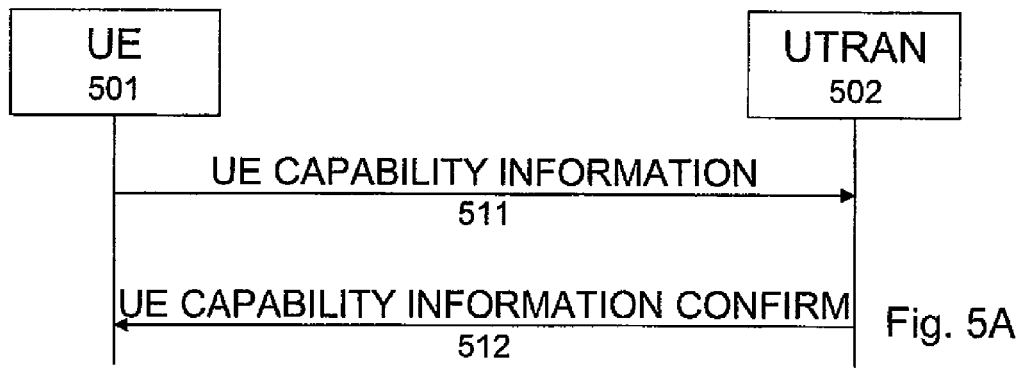
FIGS. 5A, 5B and 5C show a plurality of circumstances in which measurement capability information is transferred from the UE to the UTRAN.
Figure 5B:
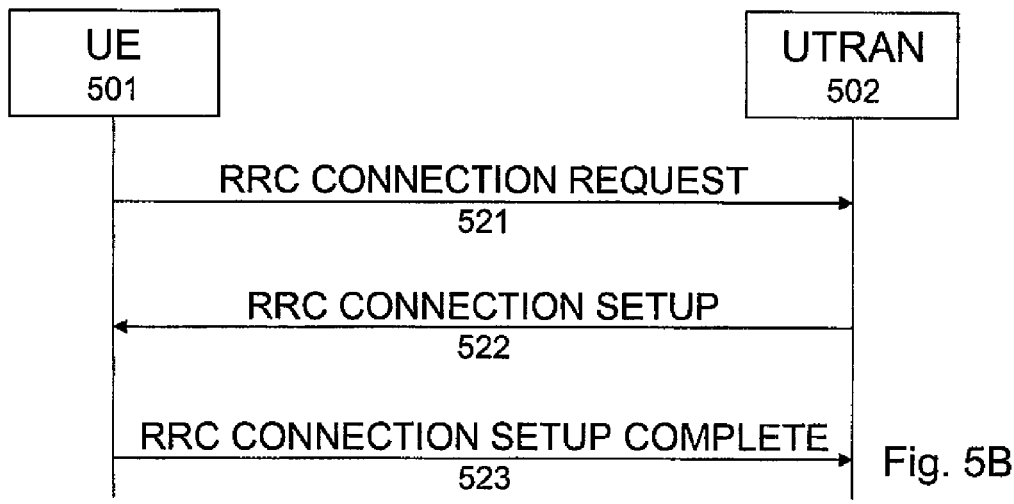
Figure 5C:

FIGS. 5A, 5B and 5C show a plurality of circumstances in which measurement capability information is transferred from the UE 501 to the UTRAN 502. Measurement capability information is transferred as part of the set of UE radio access capability information Elements. FIG. 5A illustrates the transmission of a UE CAPABILITY INFORMATION message 511 from the UE 501 to the UTRAN 502. The UE capability update procedure is used by the UE 501 to convey UE specific capability information to the UTRAN 502. The UE 501 sends a UE CAPABILITY INFORMATION message 511 to the UTRAN 502, this message contains UE radio access capability Information Elements. In reply to this message, UTRAN 502 transmits a UE CAPABILITY INFORMATION CONFIRM message 512 to UE 501. This is the normal flow of a UE capability update procedure. The UE capability update procedure is initiated by the UE. The UE initiates this procedure when it receives a UE capability enquiry message from the UTRAN, or the UE may initiate the procedure if, while in connected mode the UE capabilities change compared to those stored in the variable UE_CAPABILITY_TRANSFERRED.

FIG. 5B illustrates the transmission of an RRC CONNECTION SETUP COMPLETE message 523 from the UE 501 to the UTRAN 502 during the establishment of an RRC connection. The UE 501 initiates this procedure when an upper layer of the UE requests the establishment of a signaling connection and the UE is in idle mode, where no RRC connection exists. The UE 501 initiates the procedure by sending an RRC CONNECTION REQUEST message 521 to the UTRAN 502. If the UTRAN 502 accepts the request, it responds by sending an RRC CONNECTION SETUP message 522 to the UE 501. In response to this message, the UE 501 sends an RRC CONNECTION SETUP COMPLETE message 523 to the UTRAN 502. The RRC CONNECTION SETUP COMPLETE message 523 contains UE radio access capability Information Elements.

FIG. 5C shows the transfer of an INTER RAT HANDOVER INFO message 531 from a UE 501 to a UTRAN 502. This procedure is used by the UE 501 to convey RRC information needed for inter RAT handover to the UTRAN 502. The INTER RAT HANDOVER INFO message 531 contains UE radio access capability Information Elements. This message is initiated by a radio access technology other than UMTS, such as GSM.

Referring to FIG. 1 and the UMTS operating bands shown therein, a UE may support one or a plurality of UMTS operating bands. Furthermore, a given UE may additionally support one or a plurality of other network bands such as GSM bands GSM 900 or GSM 1900, for example.

The UTRAN receives the measurement capability information from the UE. The UTRAN uses this information to determine whether or not Compressed Mode is required by the UE for any inter-frequency or inter-RAT measurements which the UTRAN requires the UE to perform.

A UE which only supports band I records and transmits its capability using the set of measurement capability information elements 610. This set is defined in 25.331 at section 10.3.3.21. The variables required for such reporting are illustrated in FIG. 6. The set of measurement capability information elements 610 is used where a UE only supports UMTS band I. Accordingly, the UE need only transmit its compressed mode requirements in respect of the GSM bands it supports. The set of measurement capability information elements for such a UE are also illustrated in FIG. 6. FIG. 6 relates to a UE which supports GSM900, DCS1800 and GSM1900. The UE must report a Boolean expression for each of the GSM bands that it supports for both uplink and downlink channels. The Boolean takes the value of true or false and may be expressed using a single bit.

For a UE which supports a band other than band I, or a plurality of UMTS bands, then an alternative set of measurement capability information elements 620 must be used. The set of measurement capability information elements for such a UE are illustrated in FIG. 7. This set is defined in 25.331 at section 10.3.3.21a. The set of measurement capability information elements 620 makes no assumption as to which UMTS band the UE can use. Thus, the set of measurement capability information elements 620 must be transmitted for each frequency band supported by the UE. The measurement capability information elements are required for the UTRAN to arrange for compressed mode to be instigated when an inter-frequency or inter-RAT measurement is required. Accordingly, when the UE reports its compressed mode requirements in respect of each GSM band in both uplink and downlink, the UE must first specify with respect to which UMTS band the compressed mode requirement applies. Furthermore, the UE must define the compressed mode requirement for each GSM band and each UMTS band in both uplink and downlink for each UMTS band that it supports. For example, a UE which can support N GSM bands and M UMTS bands will need to report a total of M×(M+N−1)×2 Booleans in respect of its compressed mode requirements for uplink and downlink.

A UE may need compressed mode for both inter-frequency and inter-RAT measurements. This is the case where a UE with more than one transceiver supports only UMTS bands and non-UMTS networks which cause sufficient interference with each other so that compressed mode is necessary for any measurements made.

In contrast, a UE with only one transceiver may support any number UMTS and non-UMTS bands at any amount of spacing. Such a UE requires compressed mode for all frequency measurements because the single transceiver of the UE can only be used for transmitting or receiving on one frequency at a time. As such a transmission gap is required in order to allow the transceiver time to perform a frequency measurement on a channel of a different frequency.

A UE may require compressed mode for all UMTS measurements. Where this is the case, both the set of measurement capability information elements 610 and the set of measurement capability information elements 620 require a significant amount of information to be transmitted from the UE to the UTRAN. This information is transmitted when the UE transmits the message UE CAPABILITY INFORMATION. This is particularly pertinent to the set of measurement capability information elements 620, where the UE must report for each UMTS band supported, for both uplink and downlink communication, whether compressed mode is required for measurements made on each of the non-UMTS bands supported. However, even for UEs which only support one UMTS band such that they can use the set of measurement capability information elements 610, these must report the need for compressed mode in respect of the non-UMTS bands supported for both uplink and downlink communication.

According to the method and apparatus disclosed herein, by providing an additional information element to the set of measurement capability information elements, the UE can report "I need compressed mode for all measurements". This information element is shown as 631 in the last row of FIG. 8.

FIG. 8 shows a new set of measurement capability information elements 630. Set 630 includes an additional multi-band information element 631 which indicates "CM needed for all measurements of frequencies different to the frequency in use". This is indicated by a Boolean expression wherein true means that the UE requires compressed mode for all measurements. "All measurements" in this case means compressed mode is required for all UMTS measurements of frequencies different to the frequency in use, in both uplink and downlink mode for all bands supported by the UE regardless of the UMTS band of the network nodes that comprise the active set for the UE.

In alternative embodiments of the method and apparatus disclosed herein but not shown in the figures, an additional information element is provided. Such an additional information element may allow the UE to report that it needs compressed mode for a particular subset of measurements. The particular subset of measurements may comprise a plurality of but not all possible measurements.

Figure 9:
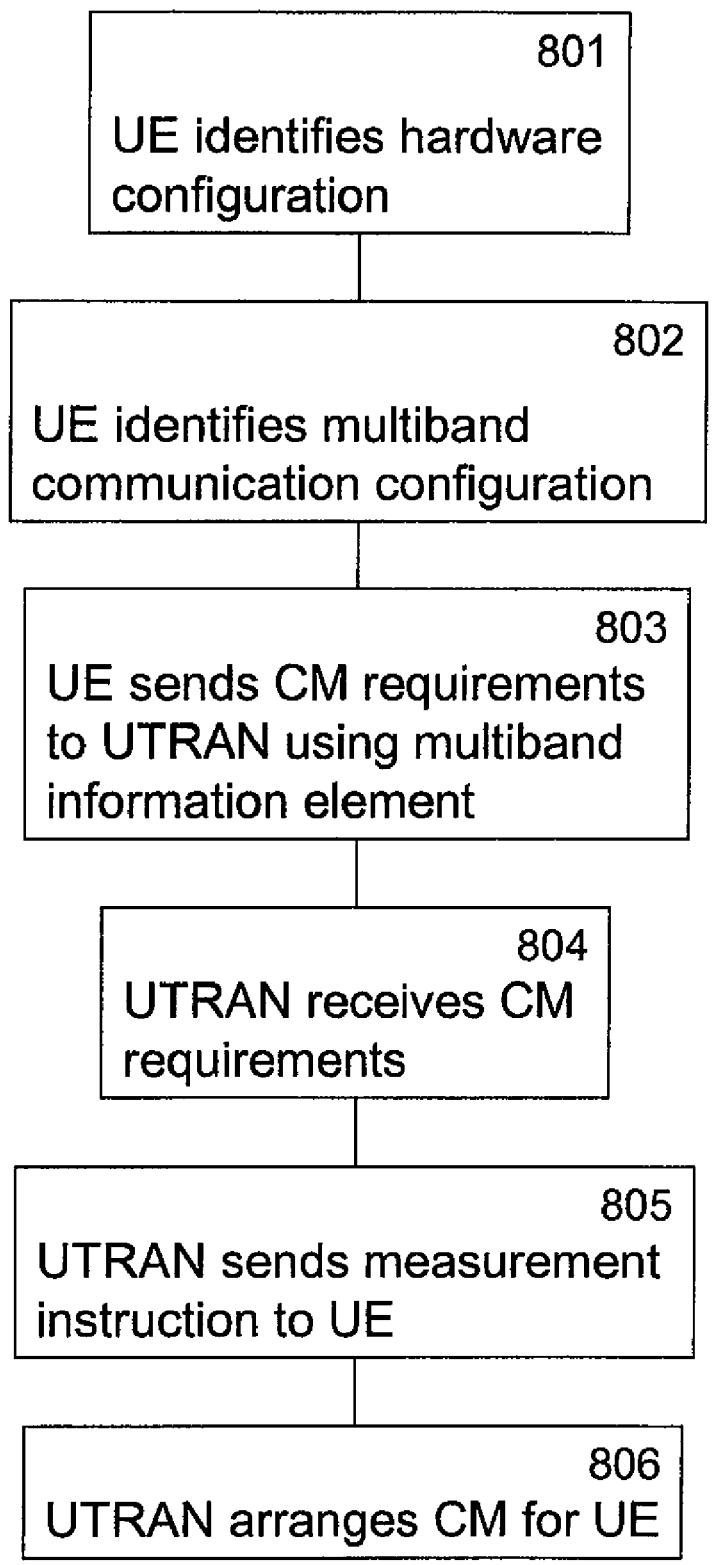
FIG. 9 shows a flow diagram of a method disclosed herein.

FIG. 9 shows a flow diagram of a method disclosed herein. Prior to sending capability information to the network (UTRAN), the UE identifies its hardware configuration 801, this can include identifying how many transceivers the UE has. Also prior to sending capability information, the UE identifies its multiband communication configuration 802, this can include identifying which systems or bands or both the UE is capable of using. The UE sends its capability information to the network 803, this capability information includes the compressed mode requirements, and according to the method disclosed herein this information is sent using at least one multiband information element. The multiband information element is an information element designating the requirement for compressed mode for more than one of a plurality of combinations of a particular frequency band being used when another or the same frequency band is measured. The network receives 804 the capability information, this contains the multiband information element. When the network requires the UE to take a measurement, the network sends a measurement instruction to the UE 805. The network also arranges for compressed mode to be implemented 806 in communications between the UE and the network.

Using the set of measurement capability information elements 610 or 620, a UE can report to the UTRAN that CM is required for all band combinations. This requires the UE_CAPABILITY_INFORMATION message to explicitly referring to each possible measurement combination for which compressed mode is required. This would require a significant amount of data to be transmitted. Conversely, a UE supporting multi-band information element 631 can more efficiently perform the function of reporting CM needed for everything by using a single Boolean expression with reference to the new information element "CM needed for all measurements". This advantageously streamlines communication and allows for more cost effective implementation.

The multi-band information element 631 allows an alternative to the per-band reporting specified in the set of measurement capability information elements 610 and 620. This IE may be added to the measurement capability 620 as a non-critical extension. Accordingly, if a UE does not support multi-band information element 631 then it would simply use the longhand version of reporting UE compressed mode requirements as shown in FIG. 7 in the set of measurement capability information elements 620.

A UE contains at least one transceiver. As discussed above, a UE with one transceiver requires a transmission gap to perform inter-frequency and inter-RAT measurements. Even if a UE contains more than one transceiver, then compressed mode may be needed for some inter-frequency and inter-RAT measurements. For example, a UE operating on UMTS band III using a first transceiver could use a second transceiver to perform inter-frequency measurements on for example band VI. However, such a UE would not be able to perform inter-frequency measurements in respect of band IV using the second receiver because bands III and IV share common uplink frequencies over at least part of the uplink frequency range. As such, the UE would require a transmission gap in which to perform the measurement. For example, using compressed mode in the communication on band III, the UE could perform an inter-frequency measurement on band IV. This inter-frequency measurement may be performed using any one of the transceivers contained within the particular UE.

Compressed mode may also be required for making inter-RAT measurements. A UE with more than one transceiver would still require compressed mode on band III if an inter-RAT measurement were required in respect of a GSM band such as DCS1900. This is because the communication frequencies between UMTS band III and DCS1900 are sufficiently close that interference may occur if the UE were to attempt an inter-frequency frequency measurement without first ceasing communication on its present communication band, band III.

The above described multi-band information element may be modified to comprise two information elements, one for uplink and one for downlink. Then, in order to report "CM needed for everything" the UE would simply require two Booleans, one for a multi-band uplink information element and one for a multi-band downlink information element. Other combinations are possible and may be preferable in certain implementations. The amount of data required to transmit the measurement capability information is reduced if the compressed mode requirement of more than one of the plurality of supported bands is communicated in a single information element.

The multi-band information element disclosed herein has been described with reference to UMTS, with GSM referenced as another network. It should be understood that the multi-band information element may be implemented in any form of communication network, such as, for example, a GSM or a CDMA network.

According to one embodiment, a method is provided for a mobile communications apparatus, the mobile communications apparatus operable to communicate with a wireless communications network using a plurality of frequency bands, the mobile communications apparatus being capable of performing a measurement of one frequency band while using another or the same frequency band, the method comprising sending a measurement capability message to the wireless communications network. The measurement capability message including an information element designating the requirement for compressed mode for more than one of a plurality of combinations of a particular frequency band being used and another or the same frequency band being measured. In one embodiment the compressed mode is required for frequency measurements. The frequency measurements may be one of inter-frequency measurements, intra-frequency measurements and inter-RAT measurements. Also, each frequency band may be a predetermined frequency band for wireless communication. In some cases, the frequency band is a UMTS band. In some embodiments, the wireless communication is by means of a cellular network. Further the information element may be expressed by a Boolean, which might be a single bit.

In some embodiments, after communicating the measurement capability message to the network, the mobile communications apparatus receives a measurement instruction message from the network. The present disclosure further anticipates a mobile communications apparatus arranged to perform the above described methods. Further a computer program product comprising code means stored on a computer readable medium is provided for performing the above described methods.

According to another embodiment, a wireless communications network is provided that is operable to communicate with at least one mobile communications apparatus. The mobile communications apparatus is operable to communicate using a plurality of frequency bands. The mobile communications apparatus is capable of performing measurements on one frequency band while using another or the same frequency band, wherein said wireless communications network is arranged to receive a measurement capability message from the mobile communications apparatus. The measurement capability message including an information element designating the requirement for compressed mode for more than one of a plurality of combinations of a particular frequency band being used and another or the same frequency band being measured.

In one embodiment, a wireless communications network is provided wherein subsequent to receiving the measurement capability message from the mobile communications apparatus, the wireless communications network sends a measurement instruction message to the mobile communications apparatus.

Figure 10:
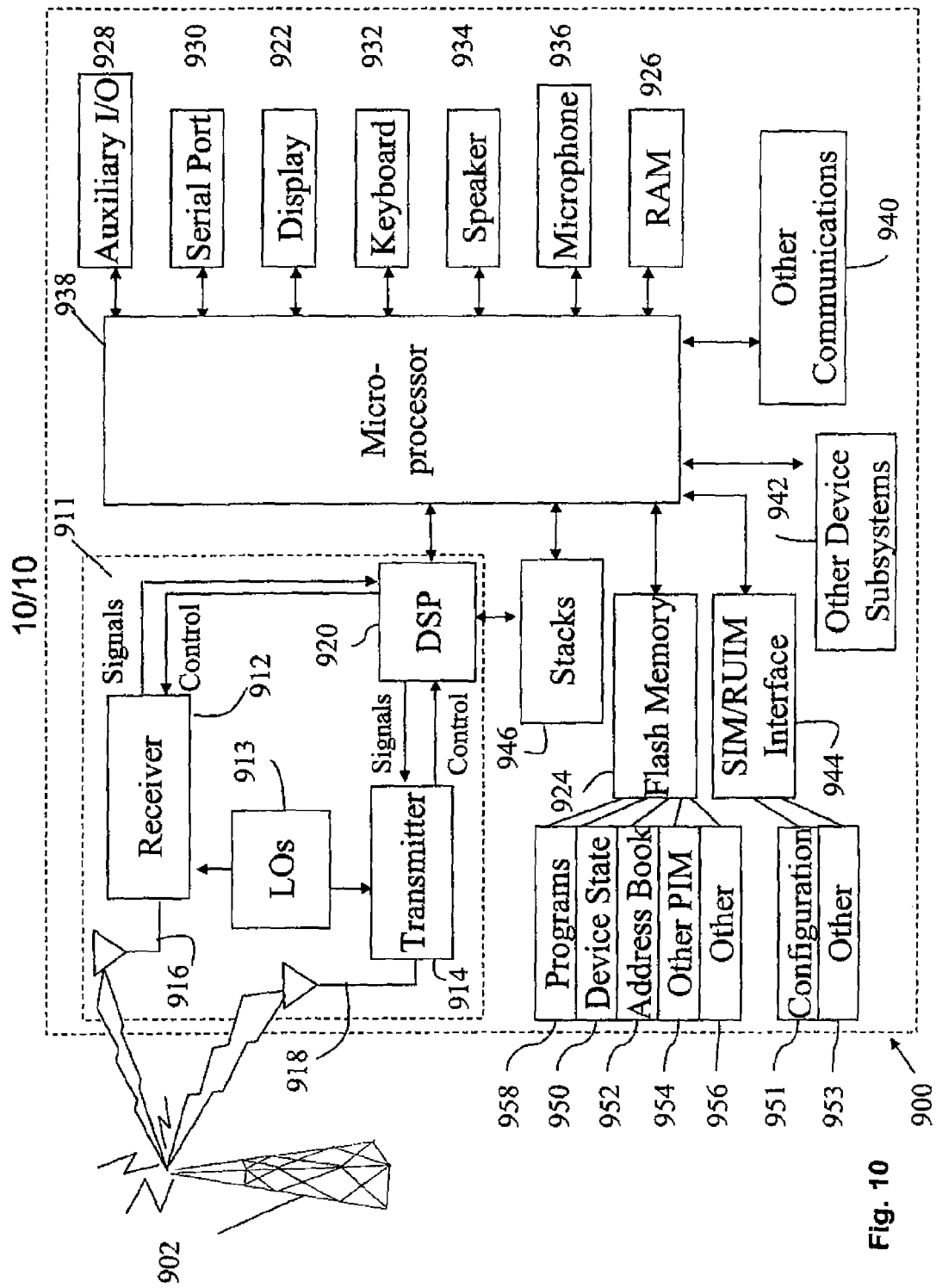
FIG. 10 shows a schematic diagram of a typical mobile communications device.

Turning now to FIG. 10, this is a block diagram illustrating a mobile device, which can act as a UE and co-operate with the apparatus and methods of FIGS. 1 to 9, and which is an exemplary wireless communication device. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, or EDGE network.

Network access requirements will also vary depending upon the type of network 902. For example, in the Mobitex and DataTAC networks, mobile station 900 is registered on the network using a unique identification number associated with each mobile station. In UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 9, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station user's corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 9, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

The skilled reader will appreciate that any appropriate manner for implementing the additional steps described above at the UTRAN or UE can be adopted in hardware, software or firmware. For example the additional information elements can be implemented at the respective components in any appropriate manner.

In the foregoing specification, the disclosure has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the steps performed, where the context permits, can be varied and to that extent the ordering of the steps as described herein is not intended to be limiting.

It is also to be noted that where a method has been described it is also intended that protection is also sought for a device arranged to carry out the method and where features have been claimed independently of each other these may be used together with other claimed features.

It will further be understood that the method and apparatus described herein can be applied in relation to any release or similar procedure following steps as set out in any appropriate standard and between any appropriate user equipment components and access network components or indeed between components of a similar nature in any case where power between links in respect of directions is controlled by the link channel in the opposite direction where either can be an uplink or downlink.

Furthermore it will be noted that the apparatus described herein may comprise a single component such as a UE or UTRAN or other user equipment or access network components, a combination of multiple such components for example in communication with one another or a sub-network or full network of such components.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A method in a mobile communications apparatus, the mobile communications apparatus operable to communicate with a wireless communications network using a plurality of frequency bands, the mobile communications apparatus being capable of performing a measurement of one frequency band while using another or the same frequency band, the method comprising sending a measurement capability message configured to be receivable by the wireless communications network, the measurement capability message comprising a multi-band information element indicating compressed mode needed for all frequency measurements different to the frequency in use;

wherein the information element is expressed by a Boolean;

wherein the Boolean expression true indicates that the mobile communications apparatus requires compressed mode for all measurements of frequencies different to the frequency in use, in both uplink and downlink mode for all frequency bands supported by the mobile communications apparatus regardless of the UMTS band of the network nodes that comprise the active frequency bands for the mobile communications apparatus.

2. The method as claimed in claim 1, wherein the frequency measurements are at least one of: inter-frequency measurements, intra-frequency measurements and inter-RAT measurements.

3. The method as claimed in claim 1, wherein each frequency band is a predetermined frequency band for wireless communication.

4. The method as claimed in claim 1, wherein the frequency band is a UMTS band.

5. The method as claimed in claim 1, wherein the wireless communication is by means of a cellular network.

6. The method as claimed in claim 1, wherein the Boolean is a single bit.

7. The method as claimed in claim 1, wherein after communicating the measurement capability message to the network, the mobile communications apparatus receives a measurement instruction message from the network.

8. A mobile communications apparatus operable to communicate with a wireless communications network using a plurality of frequency bands, the mobile communications apparatus being capable of performing a measurement of one frequency band while using another or the same frequency band, the mobile communications apparatus arranged to send a measurement capability message configured to be receivable by the wireless communications network, the measurement capability message comprising a multi-band information element indicating compressed mode needed for all frequency measurements different to the frequency in use;

wherein the information element is expressed by a Boolean;

wherein the Boolean expression true indicates that the mobile communications apparatus requires compressed mode for all measurements of frequencies different to the frequency in use, in both uplink and downlink mode for all frequency bands supported by the mobile communications apparatus regardless of the UMTS band of the network nodes that comprise the active frequency bands for the mobile communications apparatus.

9. A non-transitory computer program product comprising code means stored on a tangible computer readable medium, the computer program product arranged to cause a mobile communications apparatus to send a measurement capability message: wherein the mobile communications apparatus is operable to communicate with a wireless communications network using a plurality of frequency bands; wherein the mobile communications apparatus is capable of performing a measurement of one frequency band while using another or the same frequency band; and wherein the measurement capability message configured to be receivable by the wireless communications network, the measurement capability message comprising a multi-band information element indicating compressed mode needed for all frequency measurements different to the frequency in use;

wherein the information element is expressed by a Boolean;

wherein the Boolean expression true indicates that the mobile communications apparatus requires compressed mode for all measurements of frequencies different to the frequency in use, in both uplink and downlink mode for all frequency bands supported by the mobile communications apparatus regardless of the UMTS band of the network nodes that comprise the active frequency bands for the mobile communications apparatus.

10. A wireless communications network operable to communicate with at least one mobile communications apparatus, the mobile communications apparatus operable to communicate using a plurality of frequency bands, mobile communications apparatus being capable of performing measurements on one frequency band while using another or the same frequency band, wherein said wireless communications network is arranged to receive a measurement capability message from the mobile communications apparatus, the measurement capability message comprising a multi-band information element indicating compressed mode needed for all frequency measurements different to the frequency in use;

wherein the information element is expressed by a Boolean;

wherein the Boolean expression true indicates that the mobile communications apparatus requires compressed mode for all measurements of frequencies different to the frequency in use, in both uplink and downlink mode for all frequency bands supported by the mobile communications apparatus regardless of the UMTS band of the network nodes that comprise the active frequency bands for the mobile communications apparatus.

11. The wireless communications network as claimed in claim 10, wherein subsequent to receiving the measurement capability message from the mobile communications apparatus, the wireless communications network sends a measurement instruction message to the mobile communications apparatus.

* * * * *